Aug. 22, 1961  J. L. BOON  2,997,389
EXPOSURE CONTROL IN COLOR PRINTING
Filed April 12, 1957  2 Sheets-Sheet 1

Joseph L. Boon
INVENTOR.
BY Daniel I. Mayne
Lawrence H. Willis
ATTORNEYS

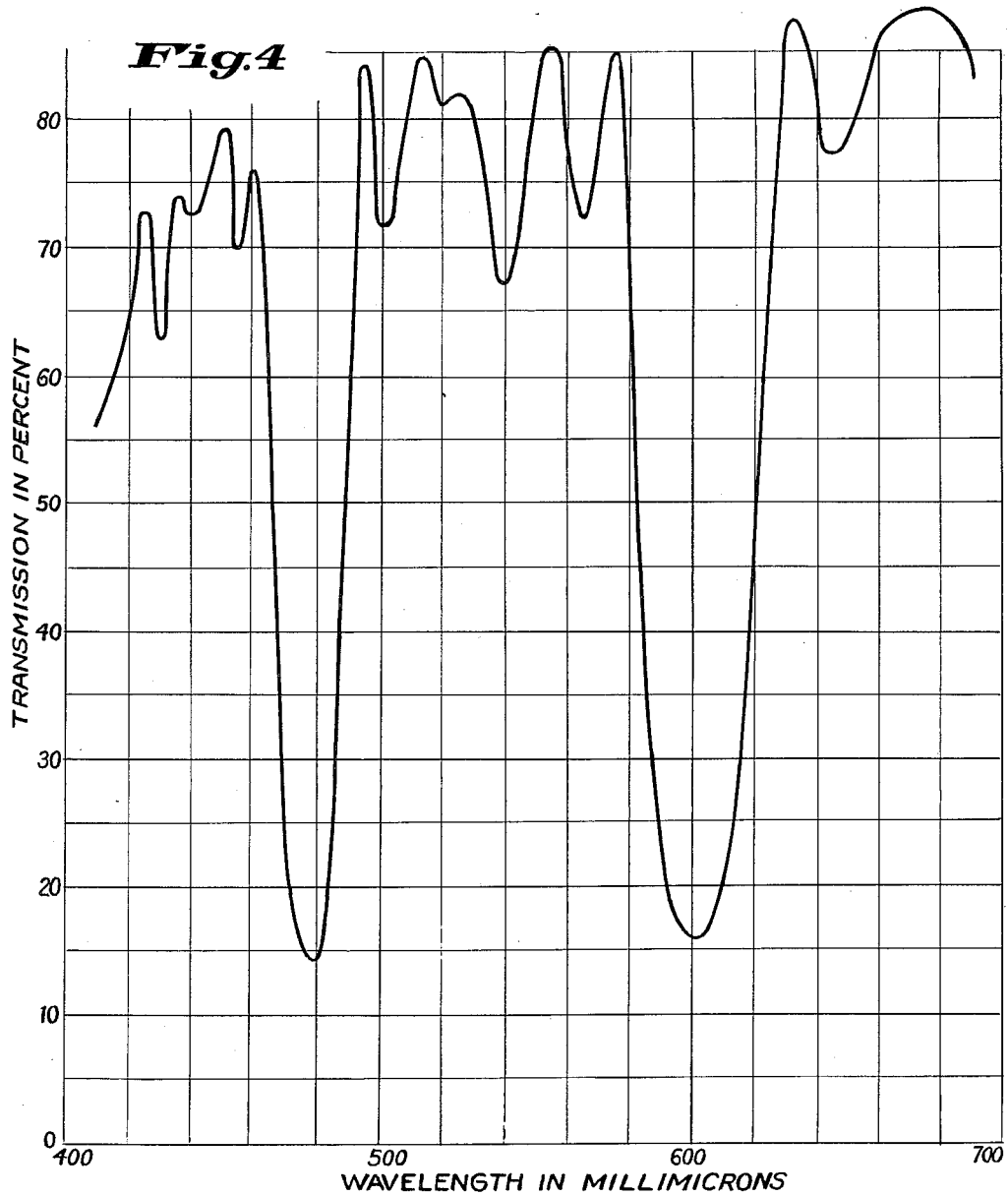

United States Patent Office 2,997,389
Patented Aug. 22, 1961

2,997,389
EXPOSURE CONTROL IN COLOR PRINTING
Joseph L. Boon, Rochester, N.Y., assignor to Eastman Kodak Company, Rochester, N.Y., a corporation of New Jersey
Filed Apr. 12, 1957, Ser. No. 652,396
5 Claims. (Cl. 96—23)

This invention relates to color photography, and more particularly, to a method of making color prints.

Multi-colored originals, either negative or positive, are commonly printed by exposure onto a sensitive material having a suitable multi-color sensitivity, this sensitive material generally having a number of photographic silver halide emulsion layers which are sensitive to different regions of the spectrum. In making color prints, either in a negative-positive system or in a reversal-reversal system, the exposure is made by means of red, green and blue light used in sequence, instead of by white light. For example, three-color negatives and positives are often printed onto sensitive films or sensitive papers having red, green and blue sensitivities, respectively, in different emulsion layers coated onto the same support, using red, green and blue lights for the exposures. Two advantages are generally claimed for printing by means of red, green and blue light. First, some increase in color saturation in the final print can be obtained, either because the red, green and blue lights distinguish the three images of the original material more fully, or because they expose the three emulsions of the print material more sharply, i.e., red light exposes primarily only the red-sensitive emulsion, etc. Secondly, by varying the intensities or durations of the red, green and blue exposures, the color balance of the final print can be varied, or alternatively, any variation in the color balance of the original can be compensated so that a more or less constant color balance in the final print is achieved.

In order to make color prints according to previous methods, a processed negative is sent to an expert for judging and this step requires the services of an expert who can judge color negatives (or positives) and tell what combination of filters is required in the color print to correct for discrepancies in the color balance or over-all hue of the original color transparency in order to obtain a color print having colors rendered correctly therein. This expert then puts an identifying code on the margin of each transparency judged, this code informing the printing operator what combination of filters to insert into the printing beam for exposure. While methods have been previously proposed for overcoming the subjective personal element which must be present during this judging process, such alternatives are in themselves quite time-consuming and costly in operation. For example, an improved method of eliminating the personal judgment of an expert is described in Tuttle et al. U.S. Patent 2,521,954, issued September 12, 1950.

The present invention provides an improved method of obtaining color prints with the advantages of color balance together with increased printing speed and less costly operation. While the common way of giving red, green and blue exposures onto the print material (by means of three successive exposures using a white-light source with red, green and blue filters being successively interposed somewhere between the source and the print material) wastes light because the filters have low transmission factors, this is not true in the method of my invention.

The blue filters commonly used in the prior art exposure technique generally absorb about two-thirds of the blue light emitted by the white-light source, transmitting only the remaining one-third. As previously mentioned, successive exposures using red, green and blue filters necessarily means that greater exposure time is necessary. It is, therefore, an object of the present invention to provide an improved method of making color prints. Another object of my invention is to provide a method of making color prints from either negative or positive transparencies in less time and at less expense than is customarily the case for printing methods using successive red, green and blue exposures. Still another object of my invention is to provide an improved means of obtaining color saturation in the final color prints. Still another object is to provide an improved method of obtaining color prints using a printing material containing a plurality of photographic emulsion layers having sensitivities in three different regions of the spectrum. Other objects will become apparent from a consideration of the following description.

In one variation of the present invention, a multi-colored negative or positive transparency is printed onto a multi-color sensitive printing material having sensitivities in three different spectral regions by employing at the commencement of the exposure any convenient form of white light, and after sufficient exposure has been given to the multi-color sensitive material to expose adequately one of the color components, a filter is introduced in the exposing light beam to remove this component. Thereafter, the exposure is continued for the remaining color components in like manner until the printing material has been exposed to all of the three primary colors of the spectrum. The present invention can be described as subtractive printing, as opposed to the conventional method of additive printing, is outlined above. The printing material can be made so that the sensitivities of the multi-color sensitive material require red, green and blue exposures of approximately the same duration for an original of average color balance. Of course, the sensitivities of the multi-color sensitive printing material can be varied to obtain any effect desired, depending upon the color balance of the original negative or positive transparency.

The operation of my new method can be briefly summarized as follows: In the case of a three-color sensitive material, a white-light exposure is given until the sensitive material has received an adequate exposure to one of the three components, which component is then removed by means of a subtractive filter, and the exposure continued for the remaining two components. This exposure continues until an adequate exposure has been given to the sensitive material for the second of the two remaining components, after which a second filter is interposed in the printing light beam to remove the second component therefrom. Exposure is then continued until the sensitive material has been exposed adequately to the one remaining component.

The novel features of my invention are set forth in more detail below, and with particularity, in the following claims. The invention itself, both as to its organization and methods of operation will best be understood from the following description of embodiments when read in connection with the accompanying drawings, in which:

FIGURE 4 is a diagrammatic reproduction of the spectrophotometric curve of a filter suitable for eliminating the yellow and blue-green regions of the spectrum according to my invention, and FIGURE 5 is a diagrammatic reproduction of a trichroic filter of the type useful in my invention, the spectrophotometric curve of this particular filter being shown in FIGURE 4.

Like reference characters refer to corresponding parts throughout the drawings.

Figure 1:
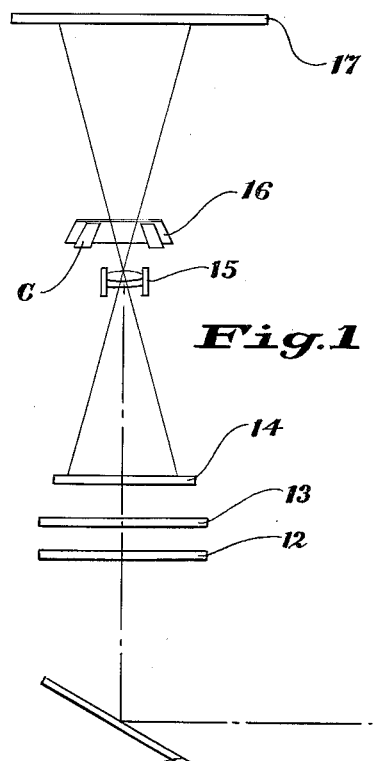
FIGURE 1 is a diagrammatic sketch showing an arrangement of parts of a projection printer for carrying out the manufacture of prints in accordance with one embodiment of the present invention.
Figure 3:
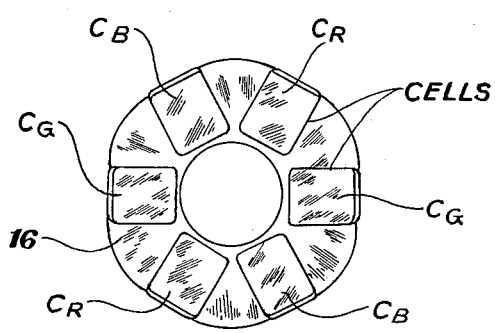
FIGURE 3 is an enlarged plan view of a light-sensitive cell arrangement which might be used in the arrangement shown in FIGURE 1.

Referring now to FIGURE 1, my new method of making color prints involves the use of a standard projection printer having a conventional "white" light source 10, in front of which the color transparency 14 (negative or positive) is placed to have its image projected by lens 15 onto a sheet of color sensitive printing material 17 located in the focal plane of the lens. The printing beam is adapted to be cut by a series of filter discs 18, 19 and 20, which absorb selectively a particular region of the spectrum. Placed in the printing beam, but adapted to transmit the beam without interference, is an annular support 16, the walls of which are inclined toward the color transparency. On the inside face of the walls of this support are fixed in spaced relation a plurality (six being shown) of barrier layer type cells C. Each of these cells is directed toward the color transparency and an efficient spacial integration of the printing light is assured. The face of each of these cells has a primary color filter fixed in covering relation therewith (not shown), and diametrically opposite ones of each pair of cells are covered by a filter of the same color. As shown in FIGURE 3, the two cells marked $C_R$ have red filters over them and these cells are coupled with one of the subtractive filters, 18, 19 or 20. For example, filter 18 can be a cyan filter and the two cells marked $C_R$ would actuate filter 18 and move it into the printing beam after the printing material 17 has received the required red absorption. The two cells marked $C_B$ have blue filters over them, while the two marked $C_G$ have green filters over them, so that each pair of cells is sensitive to only one of the primary colors and is used to measure the transmittance of the color transparency 14.

Placed beneath the color transparency 14 is a diffusion disc 13 for the purpose of assuring uniform illumination of the color transparency. Also beneath the color transparency is a filter 12 which transmits red, green and blue radiation, but is adapted to absorb the radiation between the blue and green regions of the spectrum (spectral "turquoise") or the yellow region of the spectrum, or both. In order to make efficient use of space in the printing machine, it is convenient to have a mirror positioned for reflecting the light from the illuminating source to the lens 15. This mirror can be pivotally mounted so that the printing beam can be directed away from the elements above, if desired. Since the subtractive filters 18, 19 and 20 may not effectively remove all radiation from the printing source, it is convenient to have a shutter 21 adapted to be moved into the printing beam at any stage of the process.

While the particular disposition and pairing of cells of the same color as shown in the accompanying drawings provides efficient spacial integration of the light transmitted to the printing material, it will be understood that any number of cells could be used for this purpose. In FIGURE 1, the coupled relationship of the barrier layer cells with the subtractive filters 18, 19 and 20 is not shown although any convenient electronic system as used in the art for such purposes can be employed, and my invention is not to be restricted to any particular arrangement in this regard. As indicated above, the order of insertion of the subtractive filters into the printing beam can be varied, depending upon the sensitivity characteristics of the printing material and the color balance of the color transparency being printed. By appropriate selection of printing material and subtractive filters, it is possible to adjust my process so that the subtractive filters 18, 19 and 20 fall into the printing beam at approximately the same time.

The filter 12 of FIGURE 1 is adapted to transmit substantially all the red, green and blue radiation emitted by the light source, although it is so adapted to absorb unwanted radiation in the yellow and/or turquoise regions. While this filter has been shown as a single element, it is to be understood that two or more elements can also be employed for the purpose of removing this unwanted radiation.

Figure 2:
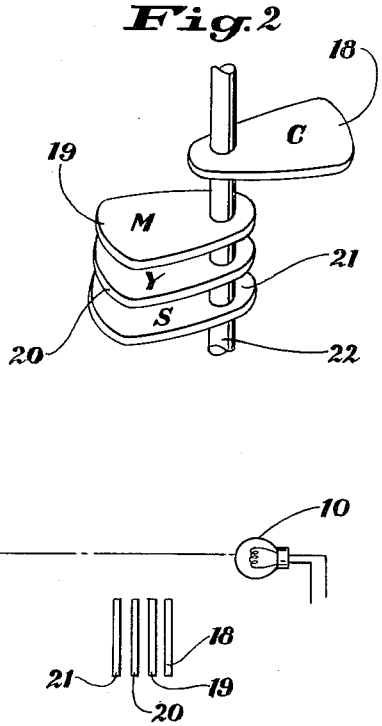
FIGURE 2 is an enlarged perspective view of a filter unit containing a plurality of subtractive filters which might be used in the arrangement illustrated in FIGURE 1.

In FIGURE 2 is shown a series of subtractive filters of the type which can be conveniently employed in my invention. The arrangement comprises a cyan filter 18, a magenta filter 19, a yellow filter 20 and a shutter 21 pivotally mounted to a shaft 22. These filters are adapted to operate independently of one another and are in coupled relationship with the barrier layer cells illustrated in FIGURE 3. The filter unit shown in FIGURE 2 can be operated in any desired sequence, depending upon the sensitivity characteristics of the printing material. For example, in some instances, it may be desirable to cut off the blue light first during the printing sequence, in which case the yellow filter 20 is interposed first in the printing beam. In FIGURE 2, one of the filters is shown in printing relationship while the other two filters are out of the printing beam. The shutter 21 can be adapted to be moved into the printing beam when all three subtractive filters are in the beam, so that no radiation can then reach the printing material. Of course, this shutter can also be adapted to be moved into the printing beam even in cases where no subtractive filters have been moved into the beam, and such an arrangement might be desirable when the printing machine is being set up for a particular printing operation.

In FIGURE 3, the barrier layer cells held by the annular support 16 of FIGURE 1 are shown in greater detail. The barrier layer cells are arranged about a central orifice through which the printing radiation is transmitted. Other arrangements of the barrier layer cells can be conveniently made, for my invention is not to be limited to the particular circular arrangement shown in the accompanying drawings.

In FIGURE 4, is shown the spectrophotometric curve of a filter useful for eliminating yellow and turquoise radiation according to my invention. Such a filter is represented by element 12 in FIGURE 1.

In FIGURE 5 is shown a cross-sectional view of an interference type filter of the variety shown in FIGURE 4. Each of the layers coated on the glass support has a thickness of approximately $\tfrac{3}{4}\lambda$. As can be seen by reference to FIGURE 5 of the drawings, the filter consists of five layers, these being alternate layers of zinc sulfide and magnesium fluoride. The method of making such interference coatings is well known to those skilled in the art, and such coating techniques form no part of the present invention. Instead of using a single interference type filter for element 12 of FIGURE 1, it is sometimes desirable to use two dichroic filters in series. One of these dichroic filters can absorb yellow radiation while the other can absorb blue-green or turquoise radiation. By employing separate dichroic filters, these can be independently operated. In some instances, it may be necessary to use only one of these dichroic filters. Such filters can be composed of alternate layers of high and low index materials, such as shown in FIGURE 5. In the preparation of dichroic filters, it has been found that such alternate layers of such high and low index materials coated to such a thickness as to give second order peak reflections ($\tfrac{3}{4}\lambda$ at 600 or 495m$\mu$) give excellent results.

A printer which can be used in the above manner, with the modifications as shown in the accompanying drawing is shown in U.S. Patent 2,521,954.

The filters illustrated in FIGURE 2 used in the printing light beam according to my invention can be any suitable filters, such as those ordinarily used in color photography. For example, the cyan or minus red filter can be a filter such as Wratten No. 44A, i.e., a filter transmitting radiation only between about 380 mμ and 580 mμ. The magenta or minus green filter can be a filter such as Wratten No. 32, i.e., a filter which absorbs only visible radiation between about 520 mμ and 595 mμ (the other regions of the spectrum being substantially completely transmitted). The yellow or minus blue filter can be a filter such as Wratten No. 12, i.e., a filter transmitting radiation only beyond about 495 mμ.

The filters used in covering relation with the barrier layer cells can likewise be any suitable type, such as those ordinarily used in making color separation prints. For example, the blue filter can be a Wratten No. 47 filter, i.e., a filter transmitting radiation only between about 350 mμ and 520 mμ. The green filter can be a Wratten No. 57A filter, i.e., a filter transmitting only between about 440 mμ and 620 mμ and beyond about 680 mμ. The red filter can be a Wratten No. 25 filter, i.e., a filter transmitting only beyond about 580 mμ.

The barrier layer cells, or photocells as they are some times known, must obviously be sensitive to blue, green and red light. It has been found in practice that the filters used over the barrier layer cells need not have transmission peaks corresponding exactly to the absorption peaks of the dyes of the original transparency or the transmission peaks of the dyes in the printing material (negative-positive system).

Where I refer to a printing material whose sensitivity lies in three different regions of the spectrum, I mean a material sensitized to recognized regions, such as the blue, green, red, ultraviolet or infra-red regions. See, for example, Jelley et al. U.S. Patent 2,403,721, issued July 9, 1946. The material need not have a uniform or continuous sensitivity throughout any of the sensitivity regions, but may have a sensitivity to a narrow band within the region as is well known with photographic printing materials. Since the dyes used in multi-color photography frequently absorb radiation in regions outside the visible region, these regions outside of the visible region can be used in printing, and it is sometimes desirable to do so.

In one method of performing my invention, a beam of white light passes through a trichroic filter (12) after being reflected from mirror 11 and then through a diffusing disc and the color transparency, such as a color negative. From the color negative, the light is focused by a suitable lens arrangement onto the printing material and the light passing to the printing material is monitored by a suitable barrier cell layer arrangement of the type illustrated in FIGURE 1. These cells are adapted to be sensitive respectively to red, green and blue light. Each photocell or barrier layer cell is connected by means of an electric circuit to an appropriate subtractive filter, such as is illustrated in detail in FIGURE 2, and each circuit is so arranged that when a barrier layer cell has received a predetermined amount of light, it will cause the filter attached to that circuit to be brought into the printing beam. The predetermined amounts of red, green and blue light, respectively, are the amounts required to produce just sufficient exposure to each of the three colors to give on final processing of the print the desired densities of the images produced therefrom. As indicated above, these amounts are dependent upon the sensitivity of the color-sensitive material on which the printing is being made, as well as upon the particular color processing method being used.

By way of example, when printing a three-color original onto a three-color sensitized paper by means of a given "white" light whereby the required duration for exposure is least for red light, somewhat longer for green light and longest for blue light, the white-light exposure is continued until the printing material has received the required amount of red radiation, no subtractive filters (i.e. 18, 19 and 20) being in the printing beam. As soon as the printing material has received sufficient red light, the barrier layer cell which is recording the red light transmitted from the three-color transparency to the printing material will automatically cause a cyan filter (such as C of FIGURE 2) to be thrown into the printing beam. The exposure then continues with this subtractive filter in the printing beam, and as soon as the printing material has received sufficient green exposure, the barrier layer cell which is recording the green light will automatically cause a magenta filter (such as M of FIGURE 2) to be thrown into the printing beam. The exposure then continues until the printing material has received sufficient blue light exposure, after which the barrier layer cell which is recording the blue light will automatically cause a yellow filter (such as Y of FIGURE 2) to be thrown into the printing beam, or alternatively a shutter (such as S of FIGURE 2). After the final exposure has been completed, the exposed printing material can then be processed according to known methods.

Instead of using conventional subtractive filters of the Wratten type in my process, it is possible to use dichroic filters which operate on interference principles. Filters of this type can be prepared as described in any one of the following patents:

U.S. 2,379,790, G. L. Dimmick, issued July 3, 1945
U.S. 2,412,496, G. L. Dimmick, issued December 10, 1946
U.S. 2,552,184, G. J. Koch, issued May 8, 1951
U.S. 2,742,819, G. J. Koch et al., issued April 24, 1956

If desired, such dichroic filters can be used in combination with subtractive filters, i.e., the interference coatings can be made on colored glass or gelatin having the desired absorption characteristics. In this manner, it is possible for the deficiencies in each type of filter to be substantially reduced.

When using dichroic filters in place of subtractive filters represented by elements 18, 19 and 20 above, it is frequently desirable to use collimated light. It is possible to obtain such light through the use of conventional lens arrangements placed in front of the illuminating source 10. That is, the lens arrangement should be placed between the illuminating source and the dichroic filters in order that the dichroic filters will function in a most effective manner. It has also been found that useful results can be obtained when using dichroic filters, even in those cases where the trichroic filter represented as element 12 of FIGURE 1 is omitted.

The term "turquoise" as used herein is intended to define that region of radiation lying between about 465 and 490 millimicrons as shown in FIG. 4 of the drawings. The maximum absorbance of the filter shown in FIG. 4 for the "turquoise" region occurs at about 480 millimicrons.

What I claim as my invention and desire secured by Letters Patent of the United States is:

1. In the method of making color prints from a color transparency onto a photographic color print material having sensitivity in the red, green and blue regions of the spectrum in discrete and different areas of said color print material, comprising uniformly illuminating said color transparency with radiation from a "white" light illuminating source having red, green and blue components and a component in at least one of the regions of the spectrum: (a) the yellow region of the spectrum and (b) that portion of the spectrum lying between about 465 and 490 millimicrons, focusing and printing said color transparency onto said color print material with radiation transmitted by said color transparency, and substantially terminating the red, green and blue exposures of said photographic color print material by interposing, between said "white" light illuminating source and said photographic color print material, subtractively-colored filters absorbing, respectively, said red, green and blue components of said illuminating source, the step of interposing an interference filter between said illuminating source and said photographic color print material during said printing, said interference filter transmitting substantially no radiation in at least one of said regions of the spectrum: (a) and (b), but transmitting radiation in at least two regions of the spectrum including: (c) the red region of the spectrum, (d) the green region of the spectrum and (e) the blue region of the spectrum.

2. In the method of making color prints from a color transparency onto a photographic color print material having sensitivity in the red, green and blue regions of the spectrum in discrete and different areas of said color print material, comprising uniformly illuminating said color transparency with radiation from a "white" light illuminating source having red, green and blue components and a component in at least one of the regions of the spectrum: (a) the yellow region of the spectrum and (b) that portion of the spectrum lying between about 465 and 490 millimicrons, focusing and printing said color transparency onto said color print material with radiation transmitted by said color transparency, and substantially terminating the red, green and blue exposures of said photographic color print material by interposing, between said "white" light illuminating source and said photographic color print material, subtractively-colored filters absorbing, respectively, said red, green and blue components of said illuminating source, the step of interposing an interference filter between said illuminating source and said photographic color print material during said printing, said interference filter transmitting substantially no radiation in either of said regions of the spectrum: (a) and (b), but transmitting radiation in at least two regions of the spectrum including: (c) the red region of the spectrum, (d) the green region of the spectrum and (e) the blue region of the spectrum.

3. The method according to claim 2 wherein said subtractively-colored filters are subtractive Wratten filters.

4. The method according to claim 2 wherein said interference filter is a filter which transmits only two of the primary color components of said illuminating source but does not transmit the other primary color component.

5. In the method of making color prints from a color transparency onto a photographic color print material having sensitivity in the red, green and blue regions of the spectrum in discrete and different areas of said color print material, comprising uniformly illuminating said color transparency with radiation from a "white" light illuminating source having red, green and blue components and a component in at least one of the regions of the spectrum: (a) the yellow region of the spectrum and (b) that portion of the spectrum lying between about 465 and 490 millimicrons, focusing and printing said color transparency onto said color print material with radiation transmitted by said color transparency, and substantially terminating the red, green and blue exposures of said photographic color print material by interposing, between said "white" light illuminating source and said photographic color print material, subtractively-colored filters absorbing, respectively, said red, green and blue components of said illuminating source, the step of interposing an interference filter between said illuminating source and said photographic color print material during said printing, said interference filter transmitting substantially no radiation in either of said spectral regions: (a) and (b), but transmitting substantially all radiation in the three primary color regions of the spectrum: (c) the red region of the spectrum, (d) the green region of the spectrum and (e) the blue region of the spectrum.

References Cited in the file of this patent

UNITED STATES PATENTS

| | | |
|---|---|---|
| 2,285,262 | Fess et al. | June 2, 1942 |
| 2,326,431 | Braunschmidt et al. | Aug. 10, 1943 |
| 2,412,496 | Dimmick | Dec. 10, 1946 |
| 2,438,303 | Simmon | Mar. 23, 1948 |
| 2,521,496 | Tuttle et al. | Sept. 12, 1950 |
| 2,627,786 | Simmon | Feb. 10, 1953 |
| 2,742,837 | Strieffert | Apr. 24, 1956 |
| 2,780,155 | Debrie | Feb. 5, 1957 |

FOREIGN PATENTS

| | | |
|---|---|---|
| 896,454 | Germany | Nov. 12, 1953 |
| 748,183 | Great Britain | Apr. 25, 1956 |
| 409,287 | Great Britain | Apr. 23, 1934 |

OTHER REFERENCES

Germany, 21,328, printed August 9, 1956 (KL56a 805).